United States Patent [19]
Young

[11] 3,749,472
[45] July 31, 1973

[54] ARTIST'S AID APPARATUS

[76] Inventor: Jesse R. Young, 5302 W. 138th St., Hawthorne, Calif.

[22] Filed: Apr. 10, 1972

[21] Appl. No.: 242,672

[52] U.S. Cl. .................................. 350/121, 353/73
[51] Int. Cl. ............................................. G03b 21/58
[58] Field of Search .................... 350/121, 123, 124; 353/73, 78, 79

[56] References Cited
UNITED STATES PATENTS

| | | | |
|---|---|---|---|
| 2,509,508 | 5/1950 | Kalff et al. | 350/123 |
| 3,522,982 | 8/1970 | Hughes | 350/124 |
| 3,191,492 | 6/1965 | Moutray | 350/124 |
| 2,927,503 | 3/1960 | Zollinger | 355/60 |
| 2,411,694 | 11/1946 | Place | 355/60 |

Primary Examiner—Samuel S. Matthews
Assistant Examiner—Richard A. Wintercorn
Attorney—Billy A. Robbins et al.

[57] ABSTRACT

An apparatus is disclosed, as for use by an artist, which may be reduced to a compact unit and which opens for use with a photographic projector, to provide a support surface, upon which a photographic image is projected and a canvas or other medium is supported. The unit incorporates a platform for receiving the projector, terminated at one end by a hinged, working-surface member incorporating a glass panel, and terminated at the other end by a reflective structure. In use, an image may be projected to a desired size (by the use of the reflective structure) to appear upon the working surface and upon which an artist's medium is supported. The platform member, working-surface member and reflective structure are hinge mounted to be folded into parallel-plane relationship thereby reducing the structure to a compact closed unit.

7 Claims, 4 Drawing Figures

PATENTED JUL 31 1973   3,749,472

ARTIST'S AID APPARATUS

BACKGROUND AND SUMMARY OF THE INVENTION

Various methods of drawing, sketching and painting have been actively pursued by many persons over the years as a form of relaxation and in some instances even with therapeutic results. The production of an artistic likeness of a subject (person, scene or so on) is usually an enjoyable and mentally rewarding experience. However, relatively few people possess the natural capability to accomplish an artistic likeness of a desired subject. Perhaps, as a consequence, various forms of aids have been proposed in the past for assistance in obtaining an artistic likeness of a desired subject. For example, paint-by-number sets have been in widespread use for a number of years to enable a relatively unskilled person to accomplish a reasonable artistic production. However such techniques are rather limiting both in subject matter and artistic expression.

Mechanical and optical devices have also been proposed to assist in accomplishing an artistic likeness or canvas or other artistic mediums. However, in general, such structures have been rather complex and somewhat cumbersome as well as expensive. As a consequence, such structures have not generally attained widespread use by amateur artists. Consequently, a need exists for an improved, convenient, inexpensive and accurate apparatus for aiding an artist in the production of any desired subject upon canvas or other medium.

In general, in accordance herewith, an apparatus is provided for use with a conventional photographic slide projector, for producing a desired subject or image on a sheet of artist's medium, e.g., canvas. The apparatus includes a platform, with hinge-mounted members at opposed ends to accomplish a relatively large projected image in a relatively small space, and additionally to provide a working surface supporting the artist's medium. The structure is in a form that may be folded, thereby placing the components in parallel planes and defining a closed case during intervals of storage or transportation.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

Figures 1, 2, 3, 4:
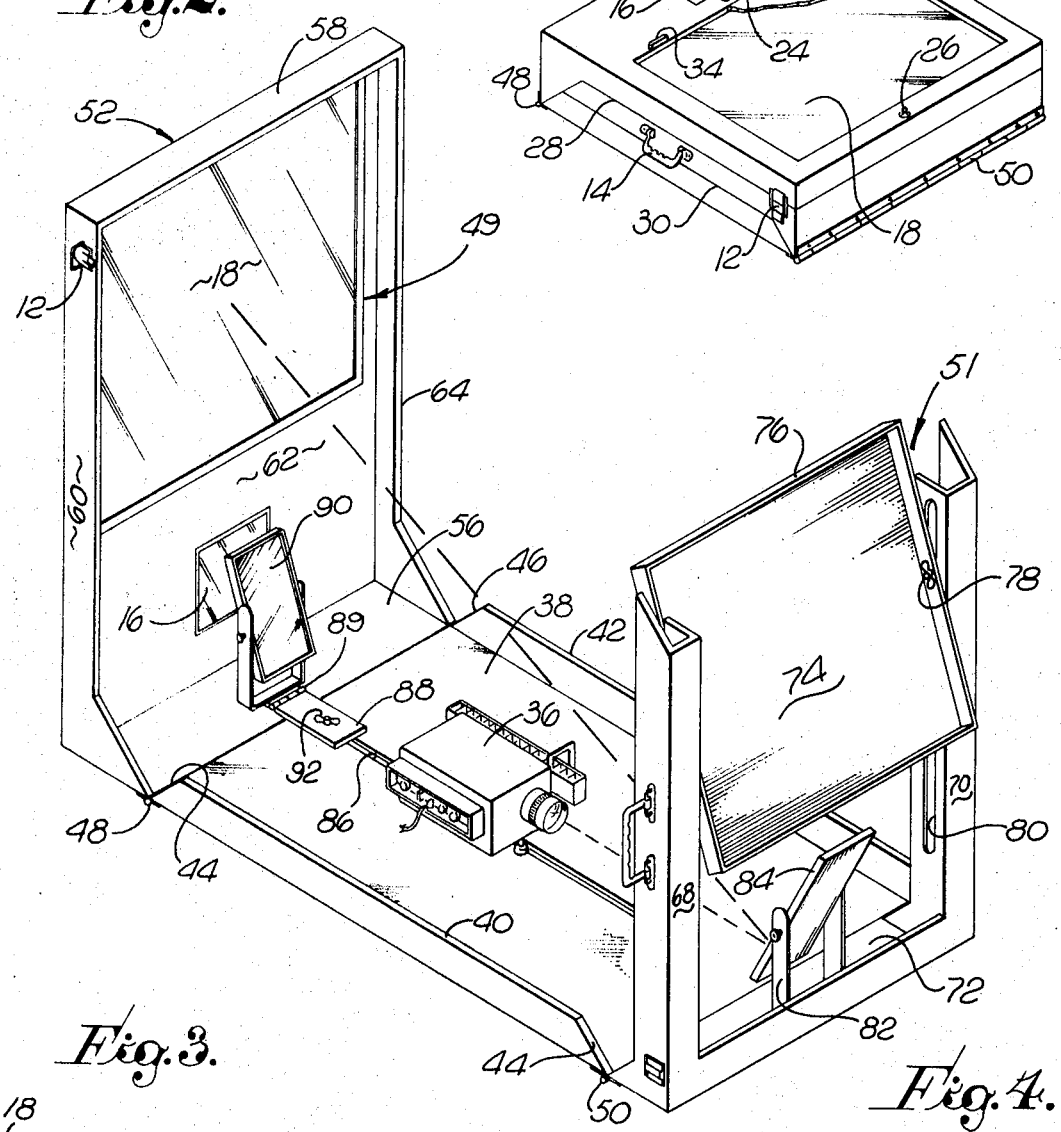
FIG. 1 is a perspective view of an apparatus in accordance herewith reduced to the configuration of a closed case.
FIG. 2 is the structure of FIG. 1 illustrated in an open configuration as when the apparatus is in use.
FIG. 3 is a diagrammatic view illustrating one operating format for the structure of FIGS. 1 and 2.
FIG. 4 is a diagrammatic view illustrating another operating format for the structure of FIGS. 1 and 2.

As required, a detailed illustrative embodiment of the invention is disclosed herein. The embodiment exemplifies the invention which may, of course, be embodied in other forms, some of which may be radically different from the illustrative embodiment. However, the specific structural and functional details disclosed herein are representative and provide a basis for the claims herein which define the scope of the invention.

Referring initially to FIG. 1, the illustrative embodiment is depicted in the closed form of a compact case of parallelepiped configuration. The structure hereof, as depicted in FIG. 1, may be conveniently and easily stored and transported. In that regard, the structure includes closure fasteners 12 for holding the components in the configuration depicted, as well as a handle 14 for convenient carrying. The apparatus further includes a small frosted glass 16 and a large light-transmitting panel 18, as disclosed in detail below, both of which may be of fragile material, e.g., glass. The glass 16 is covered by a hinge-mounted cover 20 while the panel 18 is somewhat similarly shielded by a removable cover 22. The cover 20 is mounted to be fixed closed over the glass 16 by a catch structure 24 while a similar catch structure 26 functions with the cover 22. In the folded configuration, the component parts matingly engage along abutting edges 28 and 30 which are partly coplanar with the configuration and partly angularly offset to attain an improved structure. Accordingly, when closed, the case has an exterior (as depicted in FIG. 1) which is not only sturdy but relatively rugged and durable.

To place the structure in an operative configuration, the case is opened and the panel covers 20 and 22 are removed. In the latter regard, the panel cover 20 is affixed in place by disengageable hinges 32 while the cover 22 similarly is mounted on disengageable hinges 34. Upon opening the case to an operating configuration, the structure is as depicted in FIG. 2, which will now be considered in further detail.

Generally, a projector 36 provides a light image which is variously directed to impinge upon the panel 18 which, as indicated above, is light transmissive and, accordingly, permits the passage of a light image to reverse illuminate a sheet of artist's medium, e.g., sketch paper, canvas and so on (not illustrated). The projection of the light image to the panel 18 involves the use of mirrors to accomplish a sizable image without a large projection space. As described in detail below, several alternate projection patterns may be utilized in accordance herewith, depending upon the desired image size at the panel 18, the source material and so on.

Considering the structure as illustrated in FIG. 2 in somewhat greater detail, the projector 36 is supported upon a frame, including platform member 38 which is essentially flat and serves as the basic supporting structural element of the apparatus. The sides of the platform member 38 are terminated by raised or normally extending edges 40 and 42. Generally, the major lengths of the edges 40 and 42 are parallel with the member 38; however, at the ends of the edges 40 and 42 angular offset sections 44 and 46 respectively are defined.

The ends of the platform member 38 are terminated by a pair of continuous hinges 48 and 50, respectively, which are in turn mechanically fastened to upright structures 49 and 51 (as illustrated). Generally, the upright structure 49 incorporates the light-transmissive panel 18 while the structure 51 incorporates reflecting means utilized for projecting the light image onto the panel 18.

Generally, the structure 49 includes an open five-sided parallelepiped form 52, supporting the panel 18 in a vertical position, as illustrated. Considering the form 52 in somewhat-greater detail, the hinge 48 is affixed to a wall 56 so that the latter may extend in the plane of the platform member 38. The opposed and more narrow wall 58 of the structure 52 is then joined to the wall 56 by right-angle related walls 60, 62 and 64. The wall 62 incorporates the panel 18 as well as the frosted glass 16. These light-transmissive elements 18 and 16 may be affixed in the wall 62 by fasteners or bonding means.

At a location opposed from the structure 49, the structure 51 is affixed to the continuous hinge 50 and includes a pair of vertical channel members 68 and 70 (as illustrated) which are integral with an interconnecting horizontal wall 72 that actually receives the hinge 50. A mirror 74 is supported in a frame 76 which is in turn affixed between the members 68 and 70 by fasteners 78. The fasteners 78 are pivotal and may comprise simply threaded studs and wing nuts fixed to extend through slots 80 in the members 68 and 70 to be received in the frame 76. Accordingly, the mirror 74 may be positioned at various heights and angles in relation to the platform 38.

The structure 51 also includes a yoke 82 extending upward from the wall 72, which yoke pivotally supports a reflector 84. The reflector 84 may or may not be employed in a particular set up, depending upon the desired size of the ultimate projected image.

Opposed to the reflector 84, still another reflective element is mounted on the platform 38. Specifically, as illustrated, a track 86 extends perpendicularly to the panel 18 and is engaged by a bracket 88 which pivotally supports a mirror 90, normally in a generally upright configuration. The bracket 88 is engaged to the track 86 by a removable fastener 92 which may be removed to in turn remove the bracket 88 and mirror 90. Also, the bracket 88 includes a hinge 89 to allow movement of the mirror 90 to a horizontal position.

In view of the above description of the apparatus, an explanation of the actual use thereof will now be considered to complete an understanding of the structure. With the unit set up, as illustrated in FIG. 2, a desired photographic slide is placed in the projector 36 with the light image from the projector variously directed to eventually impinge upon the panel 18. For example, the projector may direct the image onto the reflector 84 to be reflected to the panel 18. Alternatively, the projector may be set to initially project the image onto the mirror 84, then to the mirror 90, then to the mirror 74, and finally to the panel 18. Of course, the greater the length of the projected path, the larger the image that is finally presented on the panel 18. Accordingly, various paths may be provided as exemplified and illustrated in FIGS. 3 and 4, to attain the desired size image on the panel 18. In that regard, it is also to be noted that the sliding relationship between the bracket 88 and the track 86 also accommodates varying the length of the projection path.

With the desired image projected upon the panel 18, a sheet of medium 100 (FIGS. 3 and 4) is affixed to the reverse (external) side of the panel 18. The reverse-side illumination of the sheet 100 results in a visible image on the exposed surface of the sheet whereby the person using the apparatus may preliminarily sketch or outline the major objects of the subject to be reproduced. Subsequently, the person utilizing the apparatus may paint (as by various color mediums) the sheet 100 thereby matching the colors presented from the projected image.

At a time when the sheet 100 is substantially covered with paint or other opaque medium, it may become relatively difficult to see the projected colors. To provide guidance to the person using the apparatus, the bracket 82 (FIG. 2) may be removed and the image projected upon the glass 16. In this manner, the person using the apparatus is provided with a monitor image of the scene which is being reproduced, which image is particularly useful in the final completion of the picture.

Of course, the apparatus may be left in an open configuration (FIG. 2) for a prolonged interval of time allowing a person to repeatedly work on a specific scene or subject. On completion of the work, or at the termination of an interval of use, the apparatus may be reduced to the form depicted in FIG. 1 with relatively little effort. Specifically, the bracket 88 is simply folded at the hinge 89 to provide a flat surface. Thereafter, the structure 51 is folded so that the channel members 68 and 70 engage the edges 40 and 42 in coplanar relationship. Finally, the structure 49 is folded, also into a parallel relationship so that the walls 60 and 64 abut the channels 68 and 70. It is to be noted, that the space within the resulting case is normally sufficient to accommodate the mirror 74 and the reflector 84 without changing the angles and settings thereof. Of course, extreme positions will require modification.

With the components of the apparatus folded together in parallel relationship, the fasteners 12 (FIG. 1) are locked to hold the structure in the configuration of a closed case. Finally, the covers 20 and 22 may then be mounted by engagement of the hinges 32 and 34 and closure by the structures 24 and 26 to fasten the covers in protective relationship with reference to the glass 16 and the panel 18. Consequently, the apparatus is reduced to a convenient form for storage or transportation.

In view of the above considerations it is readily apparent that the structure hereof affords convenient, economical and useful apparatus for assistance in the production of art work by persons with or without substantial skill in such an endeavor. The apparatus thus affords pleasure for persons who do not have sufficient skill to produce art work without guides. The system also enables the convenient use of readily available photographic reproductions, e.g., color slides, as a source of art work. The size of the pictures produced by the use of the apparatus may be varied in accordance with the desires of the artist and the apparatus may be used in a relatively small space of convenient location. The system may also be employed to reproduce pictures or art work from various other sources by the use of different projectors. Of course, various modifications will be readily apparent to afford different operating characteristics for the structure and, accordingly, the scope hereof shall be as set forth in the claims to follow.

What is claimed is:

1. An artist's aid apparatus embodied in a closable unit, for use with a photographic projector, comprising:
  a frame structure including a flat base to receive said projector and further including affixed normally extending first edges;
  a working-surface member having normally extending second edges and including a rigid, light-transmissive work panel and a smaller light transmissive viewing panel;

hinge means for affixing said working-surface member to said frame structure in folding relationship, whereby to accommodate open and closed positional relationships;

a reflective structure having normally extending third edges and including a reflective surface for receiving a light image from said projector and reflecting said light image to said working-surface member;

hinge means for affixing said reflective structure to said frame structure opposed to said working-surface member whereby to accommodate open and closed positional relationships and whereby said reflective structure is in parallel faced opposing relationship to said working surface member, upon each of said members being open; and means for fixing said frame structure, said working-surface member and said reflective structure closed in coplanar relationship by said edges abutting together.

2. An apparatus according to claim 1 further including a mirror structure slidably affixed to said flat base of said frame structure to be variously positioned, generally in the plane of said reflective structure.

3. An apparatus according to claim 2 wherein said reflective structure includes first and second mirrors for use with said mirror structure to project an image on said light-transmissive panel.

4. An apparatus according to claim 2 wherein said working-surface member further includes a protective sheet hinged thereto for movement to shield said light-transmissive panel.

5. An apparatus according to claim 1 wherein said reflective structure includes support means for supporting said reflective surface in various relationships thereto.

6. An apparatus according to claim 2 further including a mirror structure slidably affixed to said frame structure to be variously positioned, generally in the plane of said reflective structure and wherein said reflective structure includes first and second mirrors for use with said mirror structure to project an image on said light-transmissive panel.

7. An apparatus according to claim 6 wherein said working-surface member further includes a protective sheet hinged thereto for movement to shield said light-transmissive panel and wherein said reflective structure includes support means for supporting said reflective surface in various relationships thereto.

* * * * *